United States Patent
Chang

(12) 
(10) Patent No.: US 6,662,945 B1
(45) Date of Patent: Dec. 16, 2003

(54) TOOLBOX WITH STEREO

(75) Inventor: Lee-Cheng Chang, Taichung (TW)

(73) Assignee: Joinery Industrial Co., Ltd., Taichung Hsien (TW)

(*) Notice: Subject to any disclaimer, the term of this patent is extended or adjusted under 35 U.S.C. 154(b) by 0 days.

(21) Appl. No.: 10/287,741

(22) Filed: Nov. 4, 2002

(51) Int. Cl.⁷ .............................................. B65D 85/28
(52) U.S. Cl. ...................................... 206/372; 455/344
(58) Field of Search ................................ 206/349, 372, 206/373–379, 216, 542; 361/625; 455/344, 351

(56) References Cited

U.S. PATENT DOCUMENTS

| | | | | |
|---|---|---|---|---|
| 4,817,191 A | * | 3/1989 | Adams | 455/351 |
| 4,939,912 A | * | 7/1990 | Leonovich, Jr. | 455/344 |
| 5,235,822 A | * | 8/1993 | Leonovich, Jr. | 206/542 |
| 5,339,956 A | * | 8/1994 | Thomason | 206/372 |
| 5,351,818 A | * | 10/1994 | Daneshvar | 206/216 |
| 5,447,041 A | * | 9/1995 | Piechota | 206/542 |
| D375,311 S | * | 11/1996 | Keseling et al. | D14/168 |
| 5,810,168 A | * | 9/1998 | Eggering | 206/372 |
| 6,305,547 B1 | * | 10/2001 | Curran | 206/542 |

* cited by examiner

Primary Examiner—Luan K. Bui
(74) Attorney, Agent, or Firm—Alan D. Kamrath; Rider Bennett, LLP.

(57) ABSTRACT

A toolbox-stereo combination includes a toolbox and a stereo attached to the toolbox. The toolbox includes a first shell and a second shell. The first shell is pivotally connected with the second shell. The first shell includes at least one buckle. The second shell includes at least one hook for engagement with the at least one buckle. The stereo is attached to the first shell in a removable manner. The first shell includes at least one hole extending through its thickness. The stereo includes at least one hole defined therein. At least one fastener is driven through the at least one hole of the first shell into the at least one hole of the stereo. The first shell includes an external side and a recess defined in the external side for receiving the stereo. The stereo includes a front side flush with the external side of the first shell.

5 Claims, 6 Drawing Sheets

TOOLBOX WITH STEREO

BACKGROUND OF INVENTION

1. Field of Invention

The present invention relates to a toolbox and, more particularly, to a toolbox-stereo combination.

2. Related Prior Art

Conventional toolboxes such as taught in Taiwanese Patent Publication No. 396933 provide a single purpose of holding tools in position during storage or transportation. A mechanic may take a toolbox and work. While working, the mechanic may feel like having some music, news and/or weather forecast. He may carry a Walkman with a built-in radio and put on a pair of earphones connected with the Walkman. However, it is not comfortable to put on the earphones. He cannot share the music with others. Furthermore, a radio of such a size often works inadequately. Alternatively, he may bring a portable stereo with him. However, it is inconvenient to bring the portable stereo. The portable stereo occupies space that could be scarce. Furthermore, when placed on a workbench, the portable stereo could interfere with the work of the mechanic.

Therefore, the present invention is intended to obviate or at least alleviate the problems encountered in the prior art.

SUMMARY OF INVENTION

It is the primary objective of the present invention to provide a toolbox-stereo combination.

According to the present invention, a toolbox-stereo combination includes a toolbox and a stereo attached to the toolbox. The toolbox includes a first shell and a second shell. The first shell is pivotally connected with the second shell. The first shell includes at least one buckle. The second shell includes at least one hook for engagement with the at least one buckle. The stereo is attached to the first shell in a removable manner. The first shell includes at least one hole extending through its thickness. The stereo includes at least one hole defined therein. At least one fastener is driven through the at least one hole of the first shell into the at least one hole of the stereo. The first shell includes an external side and a recess defined in the external side for receiving the stereo. The stereo includes a front side flush with the external side of the first shell.

Other objectives, advantages, and novel features of the invention will become more apparent from the following detailed description when taken in conjunction with the attached drawings.

BRIEF DESCRIPTION OF DRAWINGS

The present invention will be described through detailed illustration of embodiments referring to the attached drawings.

DETAILED DESCRIPTION OF PREFERRED EMBODIMENT

Figure 1:
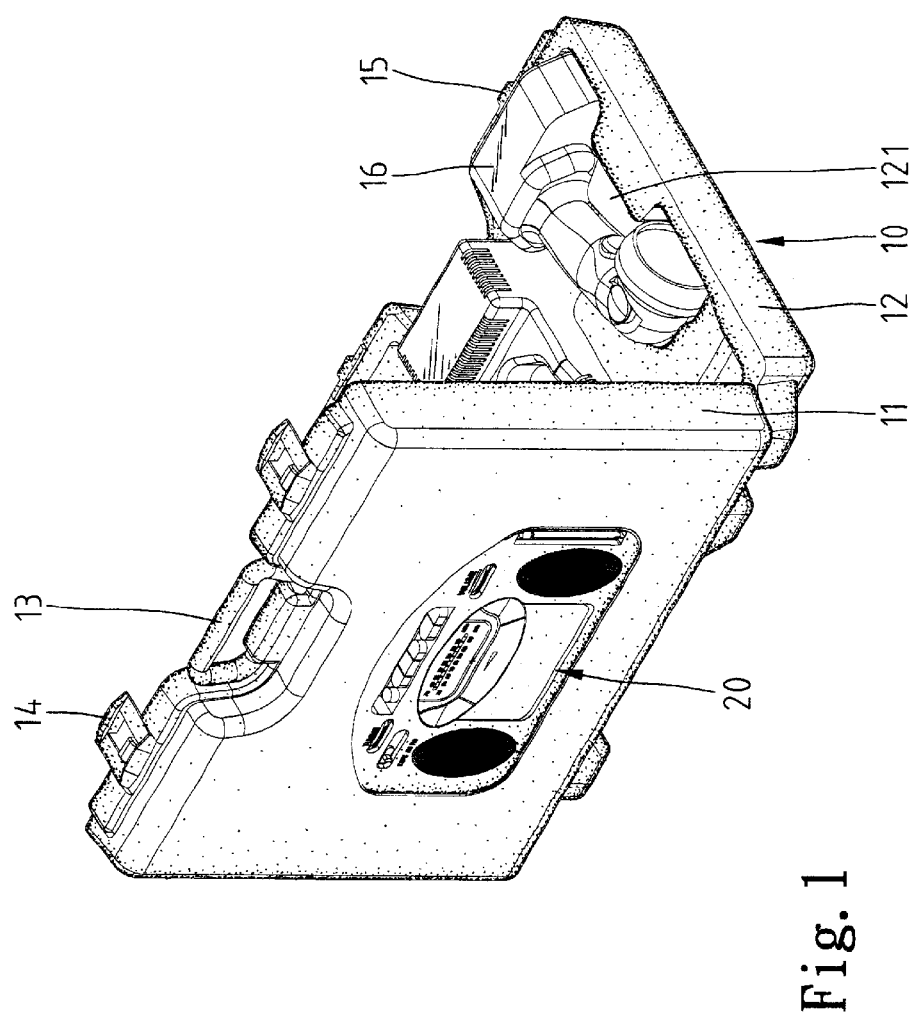
FIG. 1 is a perspective view of a toolbox-stereo combination according to a first embodiment of the present invention.
Figure 2:
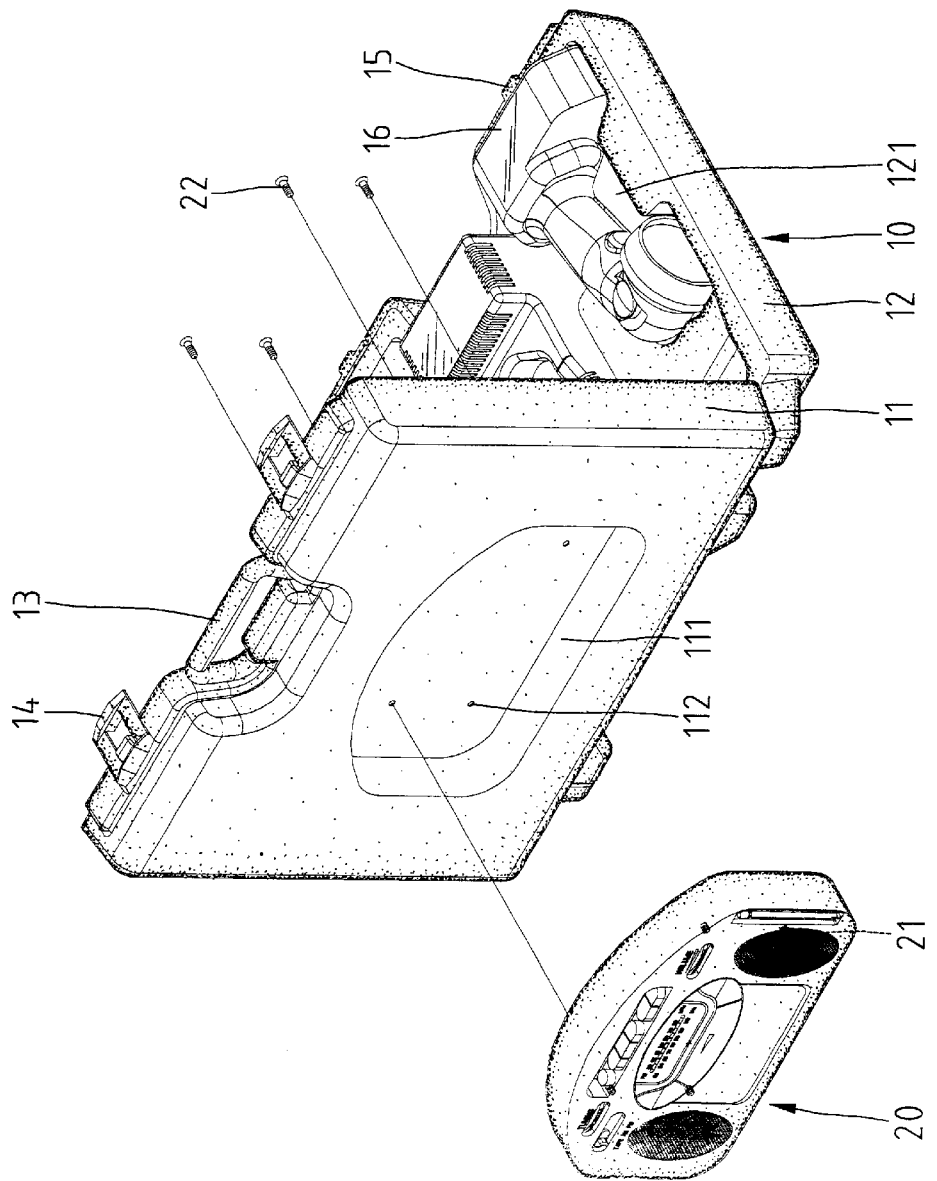
FIG. 2 is an exploded view of the toolbox-stereo combination of FIG. 1.
Figure 3:
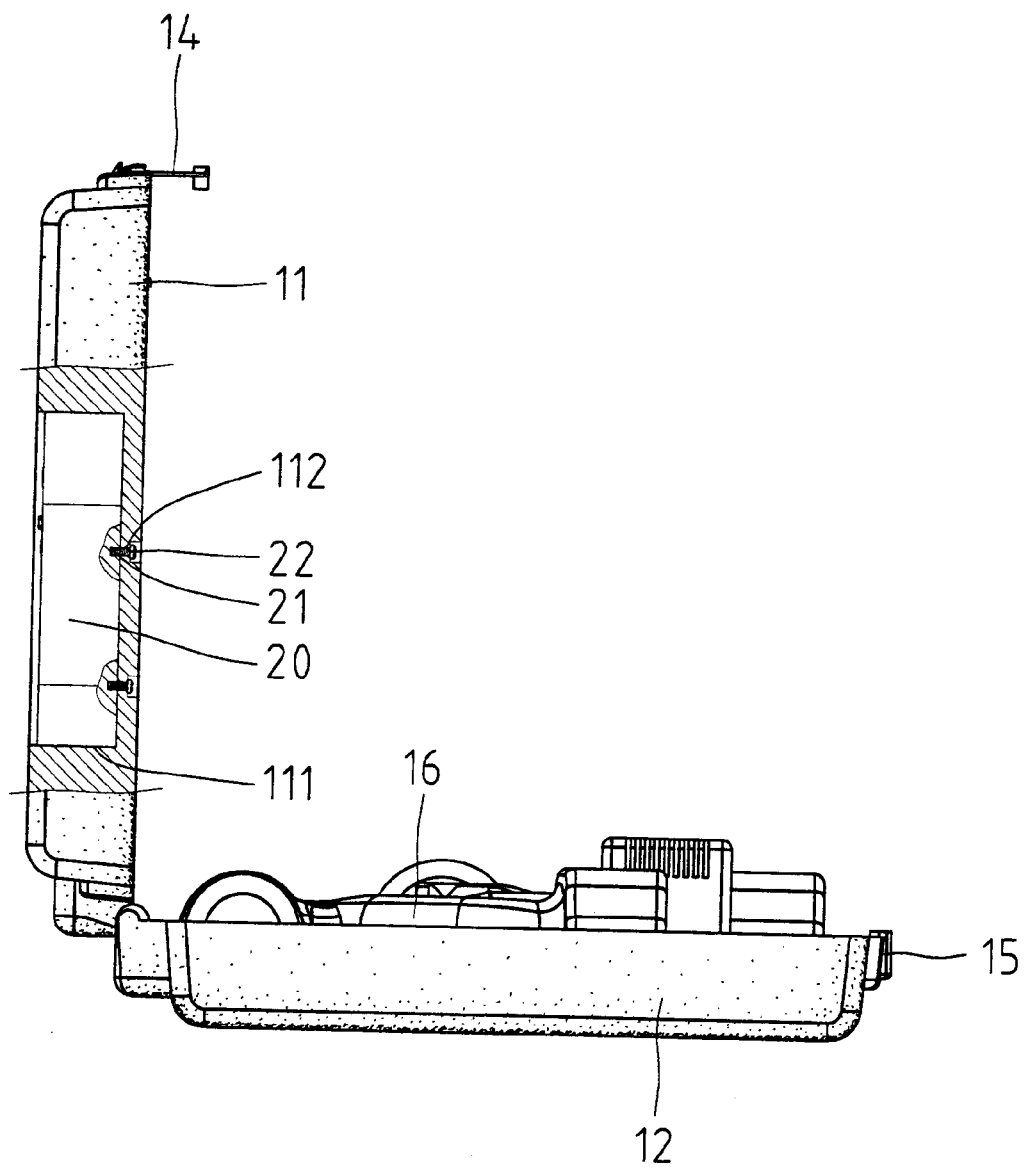
FIG. 3 is a cross-sectional view of the toolbox-stereo combination of FIG. 1.

Referring to FIGS. 1–3, a toolbox-stereo combination includes a toolbox 10 and a stereo 20 combined with the toolbox 10.

The toolbox 10 includes a first shell 11 and a second shell 12 pivotally connected with the first shell 11. The second shell 12 includes an internal side in which recesses such as identified by "121" are defined for receiving tools such as referred to by "16." A handle 13 is pivotally connected with the first shell 11 for easy carrying by a user. Two buckles 14 are pivotally connected with the first shell 11. Two hooks 15 are formed on the second shell 12. The buckles 14 can be engaged with the hooks 15 for retaining the toolbox 10 in a closed position.

The first shell 11 includes an external side in which a recess 111 is defined in order to receive the stereo 20. A plurality of holes 112 extends through the first shell 11 so that they communicate within the recess 111 as best shown in FIGS. 2 and 3. The stereo 20 includes a rear side in which a plurality of countersink holes 21 is defined.

In assembly, the stereo 20 is received in the recess 111. It is preferred that a front side of the stereo 20 is [[in]] flush with the external side of the first shell 11 around the recess 111 . A screw or threaded bolt 22 is driven through each of the holes 112 into one of the holes [[2]] 21, thus securing the stereo 20 to the toolbox 10.

Figure 4:
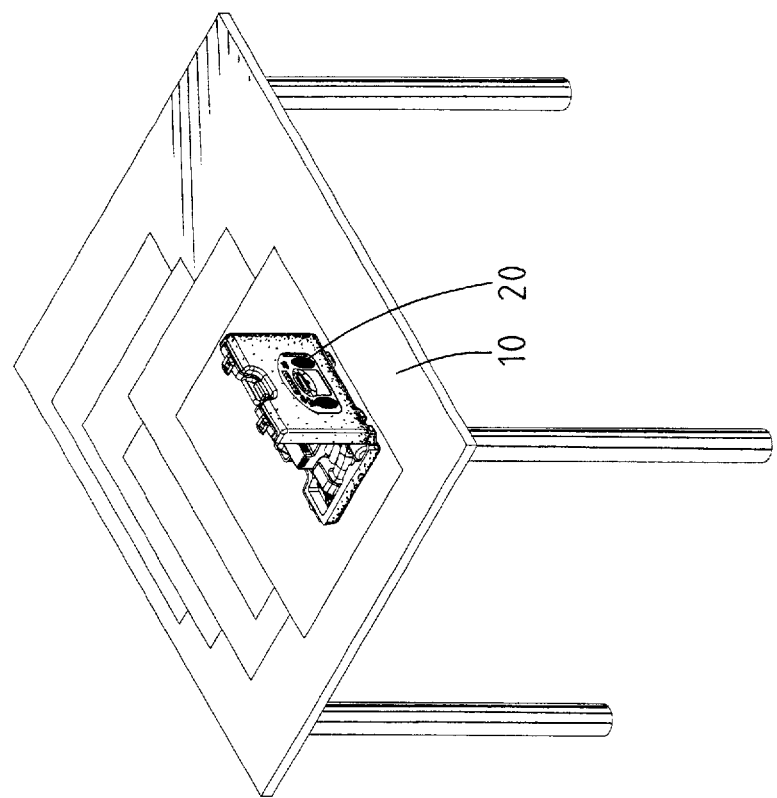
FIG. 4 is a perspective view of the toolbox-stereo combination of FIG. 1 put on a workbench or table in a workshop.
Figure 4:
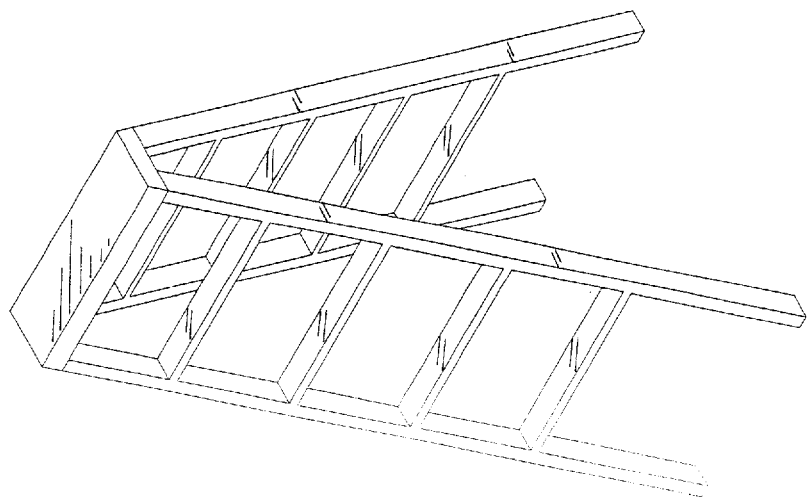

Referring to FIG. 4, the toolbox-stereo combination is put on a workbench or table in a workshop. A mechanic can open the toolbox 10 to retrieve one tool or more from the toolbox 10 and work. While working, he can listen to the stereo 20. The stereo 20 does not occupy an area of the workbench or table and therefore does not interfere with the work by the mechanic.

Figure 5:
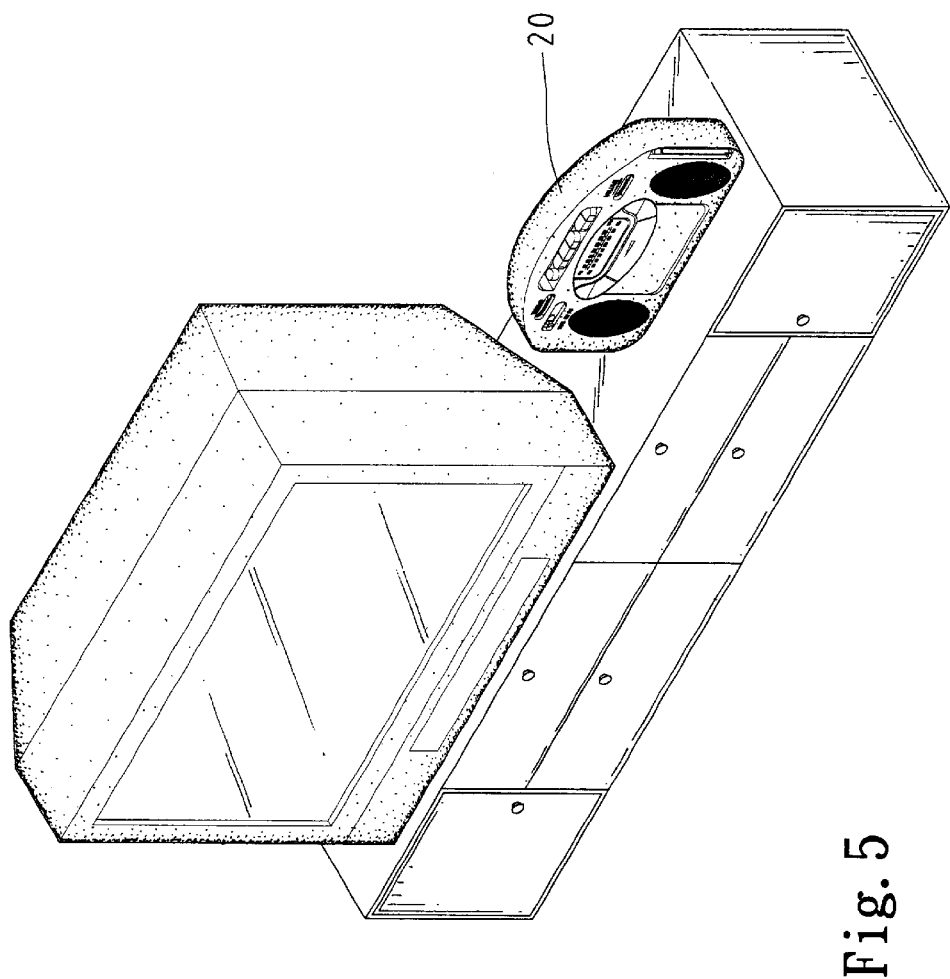
FIG. 5 is a perspective view of the toolbox-stereo combination put on a piece of furniture in a living room.

Referring to FIG. 5, the toolbox-stereo combination is put on a piece of furniture in a living room. A user can have the toolbox 10 closed and listen to the stereo 20.

Figure 6:
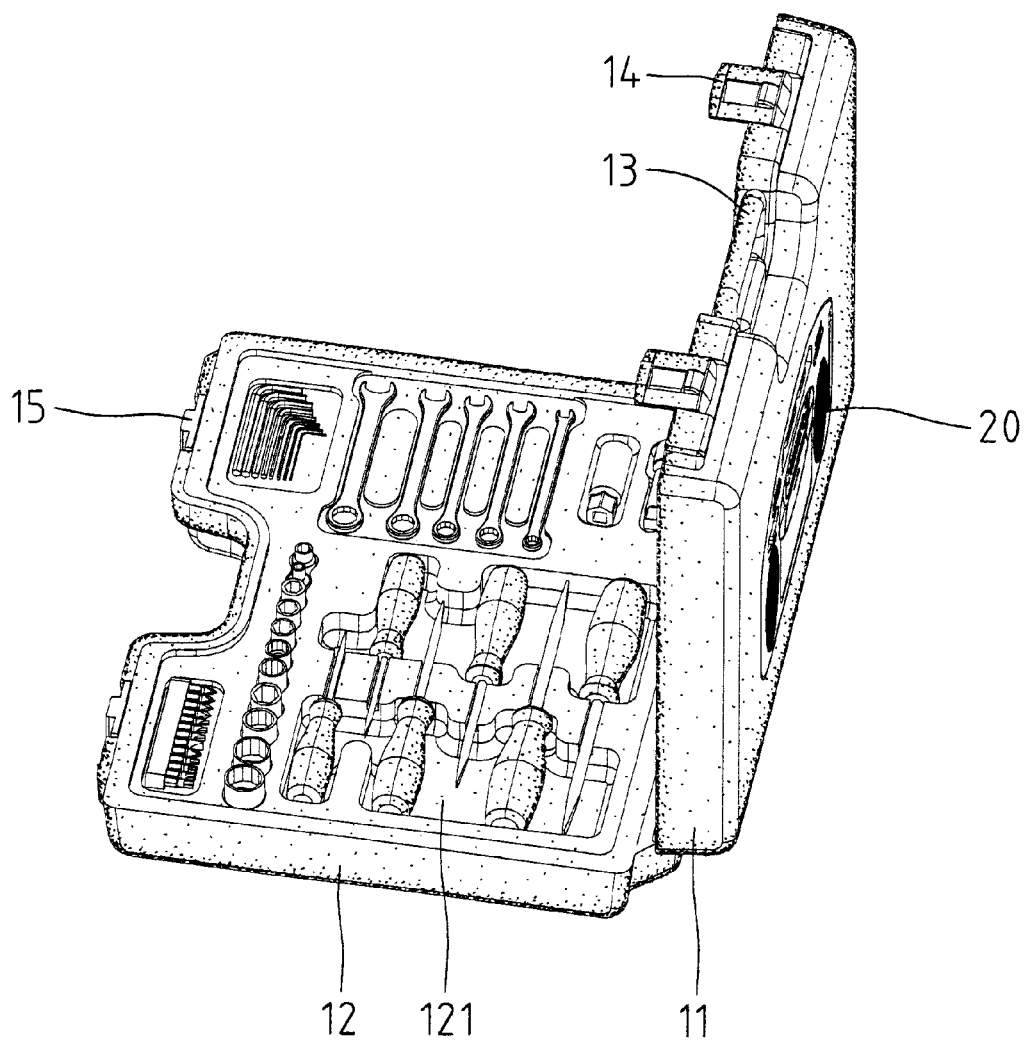
FIG. 6 is a perspective view of a toolbox-stereo combination according to a second embodiment of the present invention.

FIG. 6 shows a toolbox-stereo combination according to a second embodiment of the present invention. The second embodiment is identical to the first embodiment except for different recesses are defined in the internal side of the second shell 12 for receiving different tools.

The present invention has been described via illustration of some embodiments. After a study of this specification, those skilled in the art can derive various variations from the embodiments. Therefore, the embodiments are only taken as examples and shall not limit the scope of the present invention that is defined in the claims.

What is claimed is:

1. A toolbox-stereo combination including:
   a toolbox having a first shell and a second shell; and
   a stereo attached to the toolbox, wherein the stereo is attached to the first shell in a removable manner, wherein the first shell includes at least one hole extending through its thickness, and the stereo includes at least one hole defined therein, and the toolbox-stereo combination includes at least one fastener driven through the at least one hole of the first shell into the at least one hole of the stereo.

2. The toolbox-stereo combination according to claim 1 wherein the first shell is pivotally connected with the second shell.

3. The toolbox-stereo combination according to claim 1 wherein the first shell includes at least one buckle, and the second shell includes at least one hook for engagement with the at least one buckle.

4. The toolbox-stereo combination according to claim 1 wherein the first shell includes an external side and a recess defined in the external side for receiving the stereo.

5. The toolbox-stereo combination according to claim 4 wherein the stereo includes a front side flush with the external side of the first shell.

\* \* \* \* \*